US012420309B1

(12) United States Patent
McLean

(10) Patent No.: US 12,420,309 B1
(45) Date of Patent: Sep. 23, 2025

(54) SLOPED SCREENS FOR A SHAKER SYSTEM

(71) Applicant: Schlumberger Technology Corporation, Sugar Land, TX (US)

(72) Inventor: Claire Rosaleen Galloway McLean, Musselburgh (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/778,585

(22) Filed: Jul. 19, 2024

(51) Int. Cl.
*B07B 1/46* (2006.01)
*B07B 1/28* (2006.01)

(52) U.S. Cl.
CPC .............. *B07B 1/4645* (2013.01); *B07B 1/28* (2013.01)

(58) Field of Classification Search
CPC ........... B07B 1/4645; B07B 1/28; B07B 1/46; B07B 1/4609
USPC .......................................................... 209/311
See application file for complete search history.

(56) References Cited

U.S. PATENT DOCUMENTS 4,317,714 A * 3/1982 Forslund .................... B03B 4/02 209/44
7,063,214 B2 * 6/2006 Schulte, Jr. ........... B07B 1/4645 209/408
11,654,380 B2 * 5/2023 Colgrove ............... B01D 33/37 209/311
2010/0270215 A1 * 10/2010 Robertson ............. B07B 1/4645 209/363
2013/0037457 A1 * 2/2013 Wojciechowski ........ B07B 1/48 209/365.1

* cited by examiner

*Primary Examiner* — Michael McCullough
*Assistant Examiner* — Jessica L Burkman
(74) *Attorney, Agent, or Firm* — Jeffrey D. Frantz

(57) ABSTRACT

A screen assembly includes a screen with a screen frame and a screen filter. The screen frame includes a leading edge with a first height and a trailing edge with a second height. The screen filter extends between the leading edge and the trailing edge to provide a sloped screen surface. The screen assembly may also include an additional screen with an additional screen frame and an additional screen filter. The additional screen frame includes an additional leading edge with a respective first height and an additional trailing edge with a respective second height. The additional screen filter extends between the additional leading edge and the additional trailing edge to provide an additional sloped screen surface. The additional screen is configured to couple to the screen such that the additional sloped screen surface and the sloped screen surface form a staggered sloped screen surface.

20 Claims, 6 Drawing Sheets

SLOPED SCREENS FOR A SHAKER SYSTEM

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources, such as oil and gas, are used as fuel to power vehicles, heat homes, and generate electricity, in addition to various other uses. Once a desired resource is discovered below a surface of the earth, drilling systems are often employed to carry out drilling operations to access the desired resource. During the drilling operations, drilling fluid is pumped through a drill string into a wellbore to facilitate drilling a well. The drilling fluid then flows through an annular space defined between the drill string and the wellbore to return to equipment located at a surface. The drilling fluid carries cuttings from the wellbore to the equipment located at the surface, and it is often desirable to separate the drilling fluid from the cuttings in order to recycle (e.g., reuse) the drilling fluid.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a screen assembly includes a screen with a screen frame and a screen filter. The screen frame includes a leading edge with a first height and a trailing edge with a second height. The screen filter extends between the leading edge and the trailing edge to provide a sloped screen surface.

In certain embodiments, a screen assembly includes a screen frame comprising sloped support members on opposite lateral sides of the screen frame. The screen assembly also includes a screen filter that extends between the sloped support members to provide a sloped screen surface.

In certain embodiments, a shaker system includes a screen with a screen frame and a screen filter coupled to the screen frame to provide a sloped screen surface. The shaker system also includes an additional screen with an additional screen frame and an additional screen filter coupled to the additional screen frame to provide an additional sloped surface. The screen and the additional screen are configured to couple to one another to form a screen assembly with a staggered sloped screen surface.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
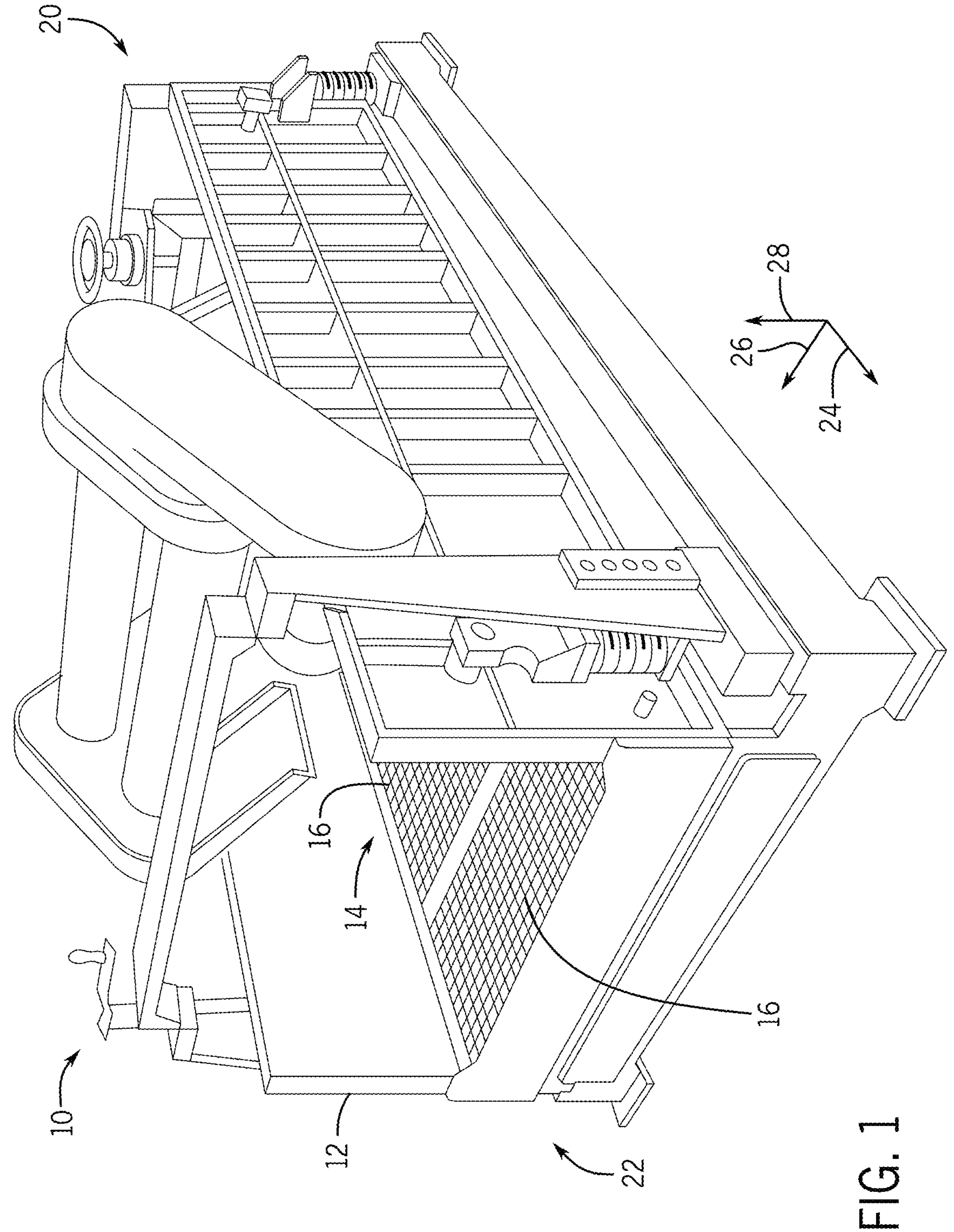
FIG. 1 is a schematic illustration of a shaker system, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted herein, during drilling operations, drilling fluid is pumped through a drill string into a wellbore to facilitate drilling a well. The drilling fluid then flows through an annular space defined between the drill string and the wellbore to return to equipment located at a surface. The drilling fluid carries cuttings from the wellbore to the equipment located at the surface, and it is often desirable to separate the drilling fluid from the cuttings in order to recycle (e.g., reuse) the drilling fluid.

A shaker (e.g., shale shaker; vibratory separator; shaker system) is a vibrating sieve-like table or deck that separates solids from fluids. In certain operations, a drilling fluid that carries cuttings is deposited at a feed end of the shaker. As the drilling fluid and the cuttings travel along a length of the shaker, the drilling fluid falls through perforations in a screen filter of a screen to a reservoir and the cuttings are conveyed via vibration along the screen to a discharge end of the shaker.

It is presently recognized that arranging multiple screens to provide staggered sloped screen surfaces (e.g., decks) may enable the shaker to hold more fluid volume (e.g., as compared to non-staggered sloped screen surfaces and as compared to non-staggered non-sloped screen surfaces). It is also presently recognized that it is desirable to efficiently install and remove the multiple screens that provide the staggered sloped screen surfaces, particularly to efficiently install and remove the multiple screens from a front end of the shaker (e.g., at the discharge end of the shaker; as opposed to a side of the shaker).

Accordingly, embodiments disclosed herein generally relate to a screen that provides a sloped screen surface. Further, multiple screens that each provide a respective sloped screen surface may be coupled to one another to provide staggered sloped screen surfaces. Advantageously, the multiple screens each include a respective screen frame and a respective screen filter to provide the respective sloped screen surface. Further, the multiple screens each include the respective screen frame that supports a latch assembly to couple the multiple screens to one another. In this way, an operator (e.g., human or machine operator) may remove the multiple screens together, such as by applying a force (e.g., pulling force) on one of the multiple screens that is proximate to the discharge end of the shaker.

With the foregoing in mind, FIG. 1 is a schematic illustration of a shaker system 10, in accordance with an embodiment of the present disclosure. The shaker system 10 may include a shaker frame 12 (e.g., shaker housing) that supports a screen assembly 14 (e.g., shaker screen assembly). The screen assembly 14 includes one or more screens 16 (e.g., one or more shaker screens). For example, the screen assembly 14 may include multiple screens 16 configured to couple to one another.

The shaker system 10 may extend from a feed end 20 (e.g., back or distal end) to a discharge end 22 (e.g., front or proximal end). To facilitate discussion, the shaker system 10 and/or components therein may be described with reference to a longitudinal axis or direction 24, a lateral axis or direction 26, and/or a vertical axis or direction 28. Further, the longitudinal axis or direction 24, the lateral axis or direction 26, and/or the vertical axis or direction 28 may be described and utilized herein as relative axes or directions, such as relative to the shaker frame 12, relative to the one or more screens 16, and so forth. For example, in FIGS. 1 and 4, the longitudinal axis or direction 24, the lateral axis or direction 26, and/or the vertical axis or direction 28 are shown relative to the shaker frame 12. In FIGS. 2, 3, and 4-7 the longitudinal axis or direction 24, the lateral axis or direction 26, and/or the vertical axis or direction 28 are shown relative to the shaker frame 12 are shown relative to the one or more screens 16.

As described herein, each of the one or more screens 16 may include or provide a sloped screen surface. Further, when the multiple screens 16 are coupled to one another, the multiple screens 16 may be coupled to one another in a manner that provides staggered sloped screen surfaces. Further, when the multiple screens 16 are coupled to one another, the multiple screens 16 may be removed from the shaker frame 12 together, such as by applying a force (e.g., pulling force) on one of the multiple screens 16 that is proximate to (e.g., closest to; accessible from) the discharge end 22 of the shaker 10.

Figure 2:
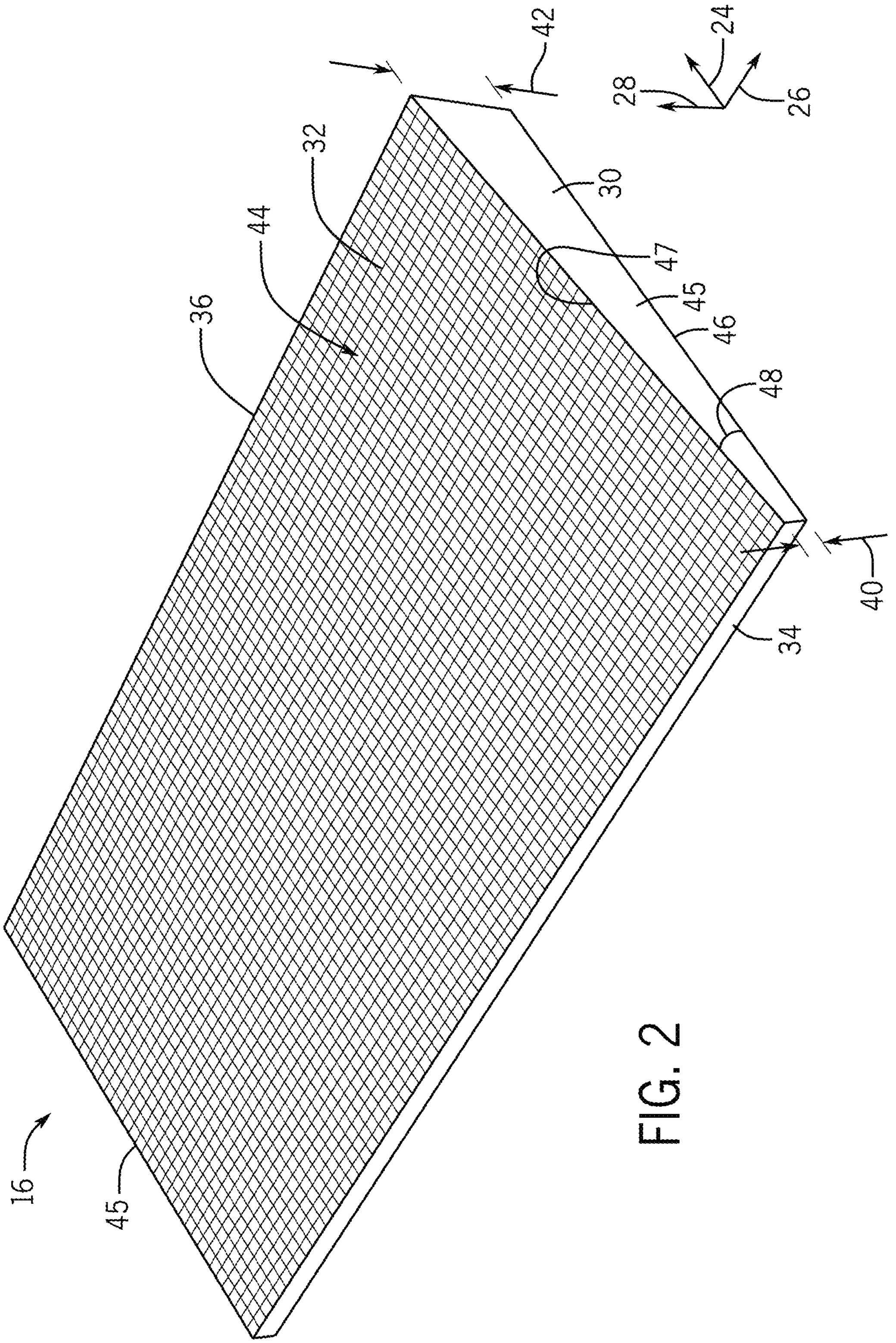
FIG. 2 is a perspective view of a screen that may be utilized in the shaker system of FIG. 1, in accordance with an embodiment of the present disclosure.

FIG. 2 is a perspective view of one screen 16 that may be utilized in the shaker system 10 of FIG. 1, in accordance with an embodiment of the present disclosure. The screen 16 includes a screen frame 30 and a screen filter 32 (e.g., mesh). The screen 16 may include or provide a leading edge 34 (e.g., first edge or side; leading edge support member) and a trailing edge 36 (e.g., second edge or side; trailing edge support member). The leading edge 34 and the trailing edge 36 are spaced apart from one another along the longitudinal axis 24 of the screen 16 (e.g., on opposite longitudinal sides of the screen 16). It should be appreciated that, with reference to FIGS. 1 and 2, the screen 16 may be installed into the shaker frame 12 of the shaker system 10 with the leading edge 34 (rather than the trailing edge 36) closer to the feed end 20 and with the trailing edge 36 (rather than the leading edge 34) closer to the discharge end 22.

As shown in FIG. 2, the screen frame 30 forms or provides the leading edge 34 with a first height 40 (e.g., leading edge height) along the vertical axis 28 of the screen 16, and the screen frame 30 forms or provides the trailing edge 36 with a second height 42 (e.g., trailing edge height) along the vertical axis 28 of the screen 16. In FIG. 2, the screen frame 30 provides the leading edge 34 with the first height 40 and the trailing edge 36 with the second height 42 uniformly across an entirety of a width of the screen 16 (e.g., along the lateral axis 26). Thus, when the screen 16 is installed on a support structure (e.g., of the shaker frame 12 of FIG. 1), the leading edge 34 extends above the support surface by the first height 40, while the trailing edge 36 extends above the support surface by the second height 42.

The first height 40 may be less than the second height 42. For example, the first height 40 may be about 10, 20, 30, 40, or 50 percent of the second height 42, or the first height 40 may be between about 10 to 50, 20 to 40, or 25 to 35 percent of the second height 42. However, it should be appreciated than any variation between the first height 40 and the second height 42 may be implemented to accommodate a desirable fluid volume and/or facilitate conveyance of solids along the screen 16. Accordingly, when the screen filter 32 is coupled to the screen frame 30, the screen filter 32 includes or provides a sloped screen surface 44. The sloped screen surface 44 slopes between the leading edge 34 and the trailing edge 36 (e.g., slopes downward toward the trailing edge 36).

In certain embodiments, the screen frame 30 includes at least two sloped support members 45 (e.g., extending along the longitudinal axis 24; on opposite lateral sides of the screen frame 30; distributed or spaced apart at discrete locations along the lateral axis 26) that may contact and be supported on the support structure (e.g., of the shaker frame 12 of FIG. 1). The at least two sloped support members 45 may include a first surface 46 (e.g., bottom surface or edge) and a second surface 47 (e.g., top surface or edge). The first surface 46 may extend along the longitudinal axis 24 of the screen 16, while the second surface may extend at an angle 48 relative to the longitudinal axis 24 of the screen 16 and relative to the first surface 46. Further, as described in more detail herein, the screen frame 30 may include latch features along both the leading edge 34 and the trailing edge 36 to facilitate coupling the screen 16 to one or more adjacent screens 16 (FIG. 1).

Figure 3:
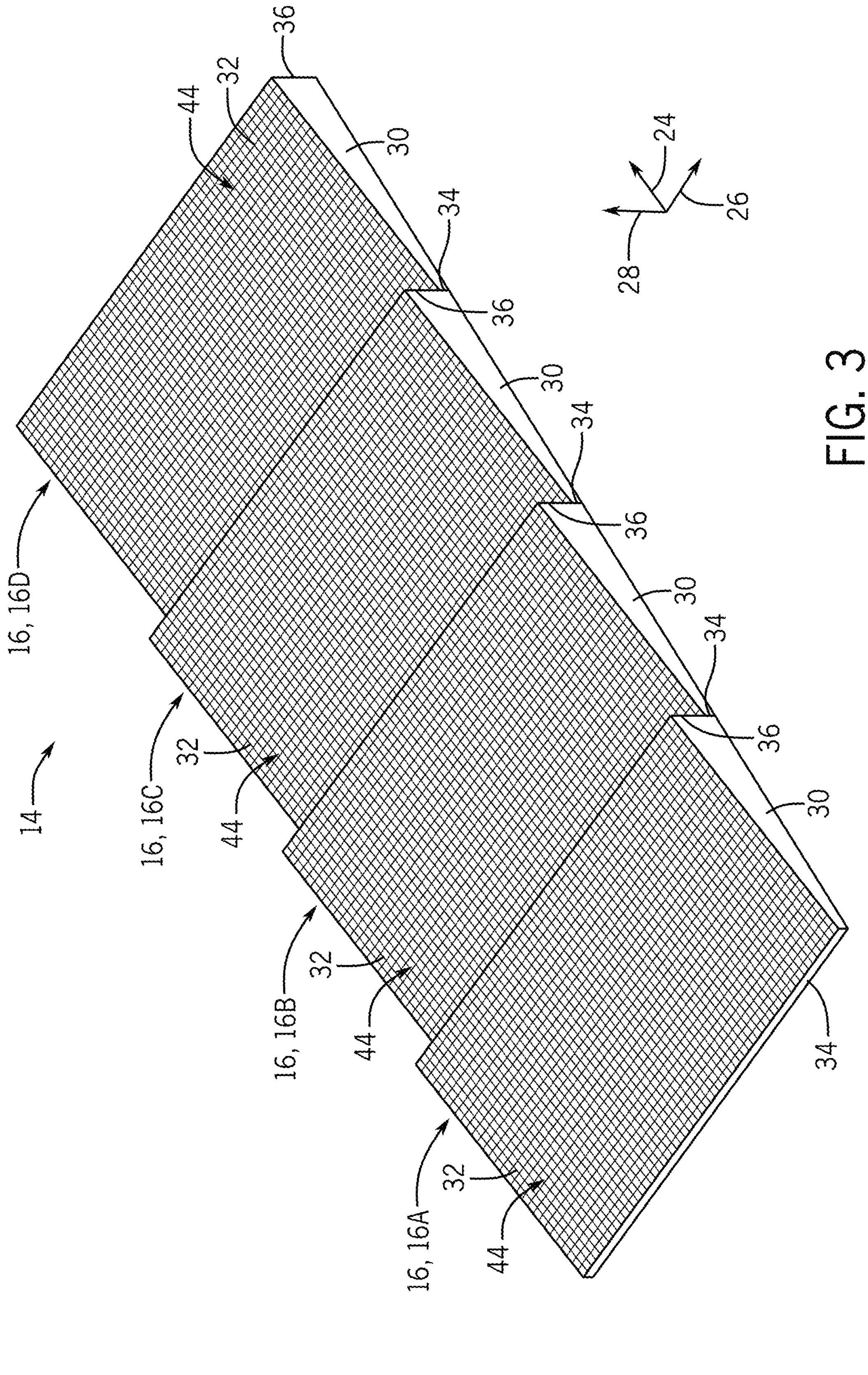
FIG. 3 is a perspective view of multiple screens that may be coupled together and utilized in the shaker system of FIG. 1, in accordance with an embodiment of the present disclosure.

FIG. 3 is a perspective view of multiple screens 16 that may be coupled together and utilized in the shaker system 10 of FIG. 1, in accordance with an embodiment of the present disclosure. In particular, the multiple screens 16 may coupled to one another to form the screen assembly 14, which may be supported in the shaker frame 12 of the shaker system 10 of FIG. 1.

Each of the multiple screens 16 includes features of the screen 16 shown and described with reference to FIG. 2. For example, each of the multiple screens 16 includes a respective screen frame 30 and a respective screen filter 32. Further, each of the multiple screens 16 includes or provides a respective leading edge 34 and a respective trailing edge

36. Further, due to height variation between the respective leading edge 34 and the respective trailing edge 36, each of the multiple screens 16 includes a respective sloped screen surface 44 that slopes between the respective leading edge 34 and the respective trailing edge 36 (e.g., slopes downward toward the respective trailing edge 36).

As described in more detail herein, the respective leading edge 34 and the respective trailing edge 36 include latch features to facilitate coupling the multiple screens 16 together. For example, as shown, the respective leading edge 34 of a first screen 16A of the multiple screens 16 may be positioned proximate to the feed end 20 of the shaker system 10 of FIG. 1. In certain embodiments, the respective leading edge 34 of the first screen 16A may be clamped (e.g., via a clamp, such as an inflatable bladder) proximate to the feed end 20 of the shaker system 10 of FIG. 1 to hold the first screen 16A within the shaker frame 12 of the shaker system 10 of FIG. 1.

Then, a second screen 16B of the multiple screens 16 may be installed (e.g., positioned) into the shaker frame 12 of the shaker system 10 of FIG. 1, such as by moving (e.g., sliding; along the longitudinal axis 24; toward the feed end 20 of the shaker system 10 of FIG. 1) the second screen 16B toward the first screen 16A that is clamped proximate to the feed end of the shaker system 10 of FIG. 1. The respective leading edge 34 of the second screen 16B may contact and engage (e.g., latch to; via latch features) the respective trailing edge 36 of the first screen 16A. Then, a third screen 16C of the multiple screens 16 may be installed (e.g., positioned) into the shaker frame 12 of the shaker system 10 of FIG. 1, such as by moving (e.g., sliding; along the longitudinal axis 24; toward the feed end 20 of the shaker system 10 of FIG. 1) the third screen 16C toward the second screen 16B that is latched to the first screen 16A. The respective leading edge 34 of the third screen 16C may contact and engage (e.g., latch to; via latch features) the respective trailing edge 36 of the second screen 16B.

Then, a fourth screen 16D of the multiple screens 16 may be installed (e.g., positioned) into the shaker frame 12 of the shaker system 10 of FIG. 1, such as by moving (e.g., sliding; along the longitudinal axis 24; toward the feed end 20 of the shaker system 10 of FIG. 1) the fourth screen 16D toward the third screen 16C that is latched to the second screen 16B. The respective leading edge 34 of the fourth screen 16D may contact and engage (e.g., latch to; via latch features) the respective trailing edge 36 of the third screen 16C.

In this way, the sloped screen surfaces 44 of the multiple screens 16 provide the staggered sloped screen surfaces, as shown. For example, the respective leading edge 34 of the second screen 16B may contact and engage the respective trailing edge 36 of the first screen 16A, such that the respective leading edge 34 of the second screen 16B is offset (e.g., below; along the vertical axis 28) from the respective trailing edge 36 of the first screen 16A to provide the staggered sloped screen surfaces across the second screen 16B and the first screen 16A. Similarly, the respective leading edge 34 of the third screen 16C may contact and engage the respective trailing edge 36 of the second screen 16B, such that the respective leading edge 34 of the third screen 16C is offset (e.g., below; along the vertical axis 28) from the respective trailing edge 36 of the second screen 16B to provide the staggered sloped screen surfaces across the third screen 16C and the second screen 16B. Similarly, the respective leading edge 34 of the fourth screen 16D may contact and engage the respective trailing edge 36 of the third screen 16C, such that the respective leading edge 34 of the fourth screen 16D is offset (e.g., below; along the vertical axis 28) from the respective trailing edge 36 of the third screen 16C to provide the staggered sloped screen surfaces across the fourth screen 16D and the third screen 16C. Together, the staggered sloped screen surfaces may also be referred to herein as a deck (e.g., a staggered sloped deck).

The respective trailing edge 36 of the fourth screen 16D may be accessible (e.g., to a human or machine operator) at the discharge end 22 of the shaker system 10 of FIG. 1. Accordingly, and due to latching between the multiple screens 16 (e.g., the first screen 16A, the second screen 16B, the third screen 16C, and the fourth screen 16D), the multiple screens 16 may be removed together by applying a force (e.g., a pulling force; along the longitudinal axis 24; toward the discharge end 22 of the shaker system 10 of FIG. 1) to the fourth screen 16D. It should be appreciated that the multiple screens 16 may have a same shape (e.g., configuration; geometry) as one another, such as for manufacturing and/or operational efficiency, for example. Further, it should be appreciated that the screen assembly 14 may include any suitable number screen(s) 16, such as 1, 2, 3, 4, 5, 6, or more screens 16.

Figure 4:
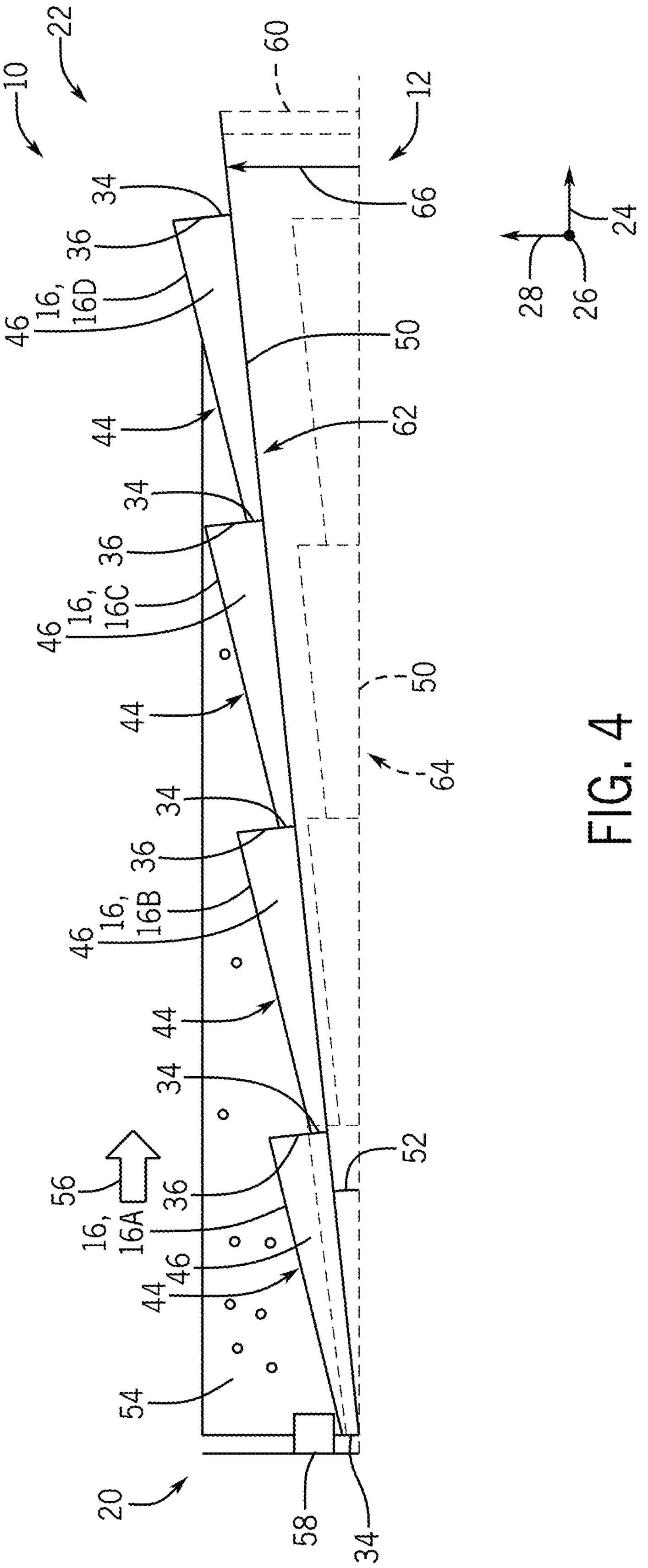
FIG. 4 is a side view of the multiple screens of FIG. 3 installed on a shaker frame member of a shaker frame that may be utilized in the shaker system of FIG. 1, in accordance with an embodiment of the present disclosure.

FIG. 4 is a side view of the multiple screens 16 of FIG. 3 installed on a shaker frame member 50 (e.g., support structure, basket; table) of the shaker frame 12 of the shaker system 10, in accordance with an embodiment of the present disclosure. To facilitate discussion and image clarity, the shaker frame member 50 is shown in simplified form and other features (e.g., side walls and other portions of the shaker frame 12) are omitted.

The shaker frame member 50 may include one or more rods or bars that extend between the feed end 20 and the discharge end 22 of the shaker system 10. As shown, the shaker frame member 50 may be positioned (e.g., oriented) at an angle 52 relative to the longitudinal axis 24 of the shaker frame 12 and/or relative to a ground surface. Further, the multiple screens 16 may be installed and supported on the shaker frame member 50, such as with respective support members 45 in contact with the shaker frame member 50 (e.g., respective second surfaces of the respective support members 45 in contact with and supported on the shaker frame members 50).

The staggered sloped screen surfaces 44 and the angle 52 together may enable the shaker system 10 to hold more fluid 54 (e.g., drilling fluid that carries solids, such as cuttings; fluid volume; as compared to non-staggered sloped screen surfaces and as compared to non-staggered non-sloped screen surfaces; as compared to staggered sloped screens surfaces without the angle 52, such as with the angle of approximately zero degrees or with the shaker frame member 50 parallel to the longitudinal axis 24 or the ground surface). In turn, this may provide more time for separation of the solids carried within the fluid 54 as the fluid 54 travels from the feed end 20 toward the discharge end 22, as shown by arrow 56. For example, as the fluid 54 travels along a length of the shaker system 10, a portion (e.g., a liquid portion) of the fluid 54 falls through perforations in the respective screen filters 32 to a reservoir and another portion (e.g., solids) are conveyed via vibration along the respective screen filters 32 (e.g., the deck formed by the respective screen filters 32) to the discharge end 22 of the shaker system 10. After the portion of the fluid 54 passes through the respective screen filters 32 to the reservoir, the portion of the fluid 54 can either return to service in the borehole immediately, be stored for measurement and evaluation, or pass through an additional piece of equipment (e.g., a drying shaker, centrifuge, or a smaller sized shale shaker) to further remove smaller solids, for example.

As described herein, the respective leading edge 34 and the respective trailing edge 36 include latch features to facilitate coupling the multiple screens 16 together. For example, as shown, the respective leading edge 34 of the first screen 16A may be positioned proximate to the feed end 20 of the shaker system 10. In certain embodiments, the respective leading edge 34 of the first screen 16A may be clamped (e.g., via a clamp 58, such as an inflatable bladder) proximate to the feed end 20 of the shaker system 10 to hold the first screen 16A within the shaker frame 12 of the shaker system 10.

Then, the second screen 16B may be installed (e.g., positioned) into the shaker frame 12 of the shaker system 10 of FIG. 1, such as by moving (e.g., sliding; along the longitudinal axis 24; toward the feed end 20 of the shaker system 10) the second screen 16B toward the first screen 16A. The respective leading edge 34 of the second screen 16B may contact and engage (e.g., latch to; via latch features) the respective trailing edge 36 of the first screen 16A. Then, the third screen 16C may be installed (e.g., positioned) into the shaker frame 12 of the shaker system 10, such as by moving (e.g., sliding; along the longitudinal axis 24; toward the feed end 20 of the shaker system 10 of FIG. 1) the third screen 16C toward the second screen 16B that is latched to the first screen 16A. The respective leading edge 34 of the third screen 16C may contact and engage (e.g., latch to; via latch features) the respective trailing edge 36 of the second screen 16B.

Then, the fourth screen 16D may be installed (e.g., positioned) into the shaker frame 12 of the shaker system 10 of FIG. 1, such as by moving (e.g., sliding; along the longitudinal axis 24; toward the feed end 20 of the shaker system 10) the fourth screen 16D toward the third screen 16C that is latched to the second screen 16B. The respective leading edge 34 of the fourth screen 16D may contact and engage (e.g., latch to; via latch features) the respective trailing edge 36 of the third screen 16C. In this way, the sloped screen surfaces 44 of the multiple screens 16 provide the staggered sloped screen surfaces and the deck, as shown.

The respective trailing edge 36 of the fourth screen 16D may be accessible (e.g., to the human or machine operator) at the discharge end 22 of the shaker system 10. Accordingly, and due to latching between the multiple screens 16 (e.g., the first screen 16A, the second screen 16B, the third screen 16C, and the fourth screen 16D), the multiple screens 16 may be removed together by applying a force (e.g., pulling force, along the longitudinal axis 24; toward the discharge end 22 of the shaker system 10) to the fourth screen 16D.

In certain embodiments, an amount of vibration and/or the angle 52 of inclination of the shaker frame member 50 are adjustable to accommodate various fluid flow rates and particulate percentages in the fluid 54. For example, one or more actuators 60 (e.g., hydraulic, pneumatic, electric actuators) may drive the shaker frame member 50 relative to other portions of the shaker frame 12 of the shaker system 10 of FIG. 1 and/or relative to the ground surface. In certain embodiments, the one or more actuators 60 may drive the shaker frame member 50 as shown by arrow 66 to pivot (e.g., rotate) at a first end to adjust the angle 52. In FIG. 4, the one or more actuators 60 may drive the shaker frame member 50 from an inclined position 62 shown in solid lines to a flat position 64 shown in dashed lines, and/or any position therebetween. However, it should be appreciated that the one or more actuators 60 may not be present and, if present, the one or more actuators 60 may drive the shaker frame member 50 between any suitable positions (e.g., a first inclined position to a second inclined position; with any suitable value of the angle 52).

Figure 5:
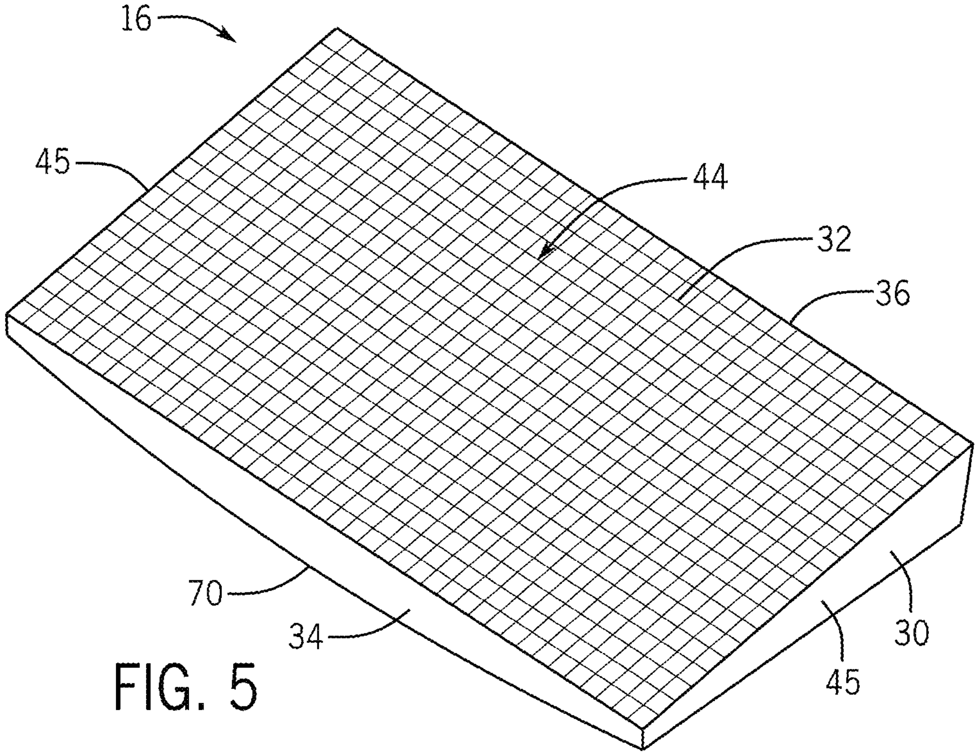
FIG. 5 is a perspective view of a screen that may be utilized in the shaker system of FIG. 1, wherein the screen includes a convex surface, in accordance with an embodiment of the present disclosure.

FIG. 5 is a perspective view of one screen 16 that may be utilized in the shaker system 10 of FIG. 1, wherein the screen 16 includes a convex surface 70, in accordance with an embodiment of the present disclosure. The screen 16 of FIG. 5 may include any of the features of the screen 16 shown and described with reference to FIG. 2. For example, the screen 16 of FIG. 5 includes the screen frame 30 and the screen filter 32 that provide the sloped screen surface 44 that slopes between the leading edge 34 and the trailing edge 36 (e.g., slopes downward toward the trailing edge 36; at least when installed in the shaker frame 12 of the shaker system 10 of FIG. 1). As described herein, the leading edge 34 and the trailing edge 36 include latch features along both the leading edge 34 and the trailing edge 36 to facilitate coupling the screen 16 to one or more adjacent screens 16 (FIG. 1).

As shown in FIG. 5, the screen frame 30 provides at least two sloped support members 45 (e.g., extending along the longitudinal axis 24; on opposite lateral sides of the screen frame 30) that may contact and be supported on the shaker frame 12 of the shaker system 10 of FIG. 1. Further, the leading edge 34 includes a leading edge support member that provides the convex surface 70. The convex surface 70 may extend longitudinally (e.g., to the trailing edge 36) and/or laterally across the screen 16 to facilitate mating or engagement to the shaker frame member 50.

Figure 6:
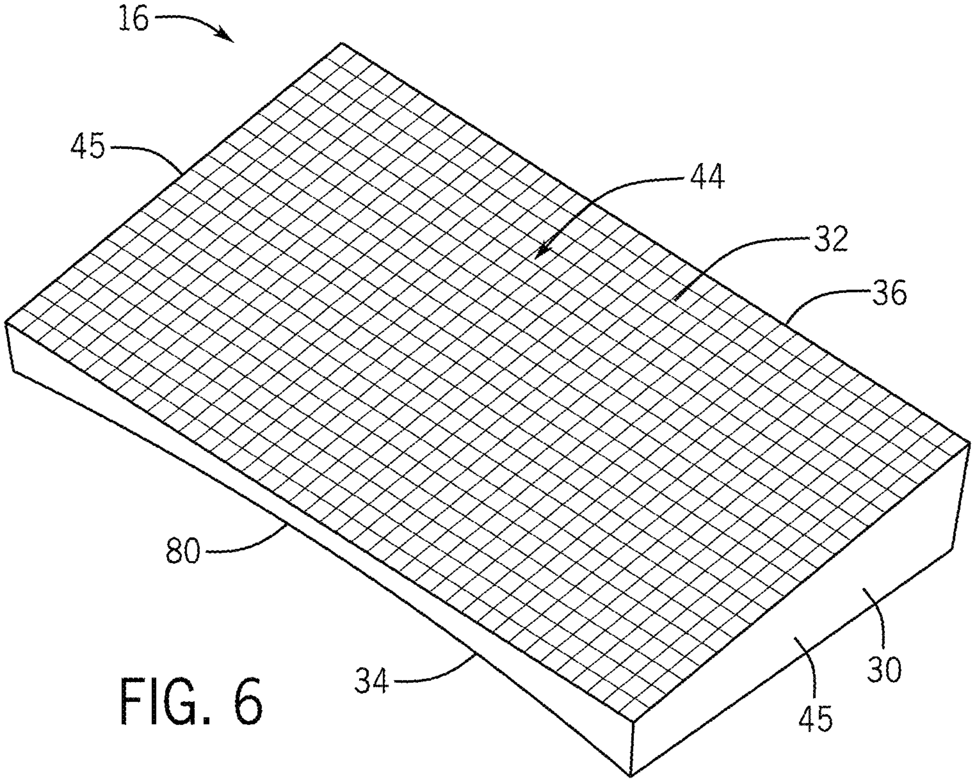
FIG. 6 is a perspective view of a screen that may be utilized in the shaker system of FIG. 1, wherein the screen includes a concave surface, in accordance with an embodiment of the present disclosure.

FIG. 6 is a perspective view of one screen 16 that may be utilized in the shaker system 10 of FIG. 1, wherein the screen 16 includes a concave surface 80, in accordance with an embodiment of the present disclosure. The screen 16 of FIG. 6 may include any of the features of the screen 16 shown and described with reference to FIG. 2. For example, the screen 16 of FIG. 6 includes the screen frame 30 and the screen filter 32 that provide the sloped screen surface 44 that slopes between the leading edge 34 and the trailing edge 36 (e.g., slopes downward toward the trailing edge 36; at least when installed in the shaker frame 12 of the shaker system 10 of FIG. 1). As described herein, the leading edge 34 and the trailing edge 36 include latch features along both the leading edge 34 and the trailing edge 36 to facilitate coupling the screen 16 to one or more adjacent screens 16 (FIG. 1).

As shown in FIG. 6, the screen frame 30 provides at least two sloped support members 45 (e.g., extending along the longitudinal axis 24; on opposite lateral sides of the screen frame 30) that may contact and be supported on the shaker frame 12 of the shaker system 10 of FIG. 1. Further, the leading edge 34 includes a leading edge support member that provides the concave surface 80. The concave surface 80 may extend longitudinally (e.g., to the trailing edge 36) and/or laterally across the screen 16 to facilitate mating or engagement to the shaker frame member 50.

Figure 7:
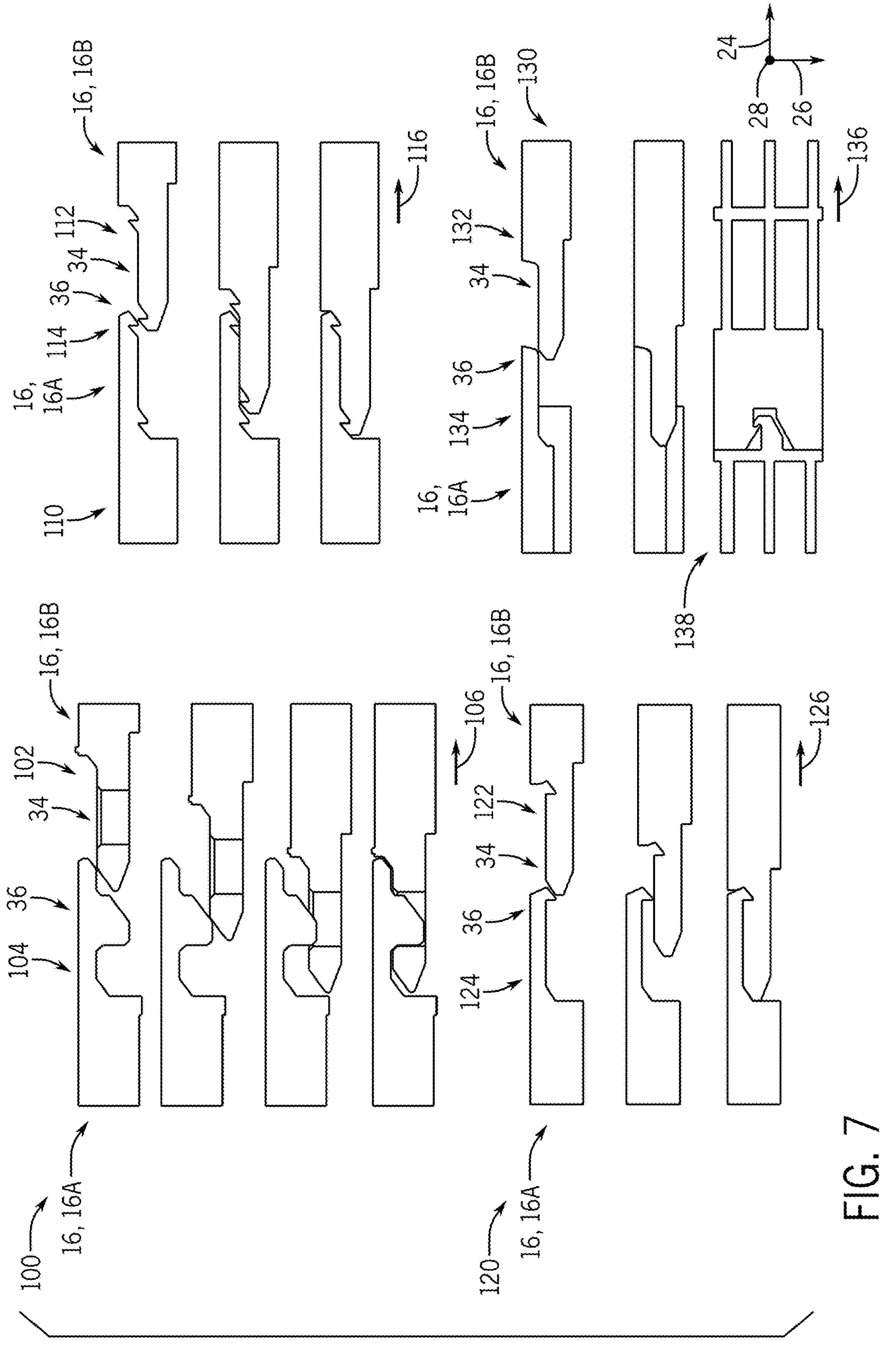
FIG. 7 is a cross-sectional side view of various latch assemblies that may be utilized to couple multiple screens, such as the multiple screens of FIGS. 3 and 4, to one another to facilitate installation and removal of the multiple screens in the shaker system of FIG. 1, in accordance with an embodiment of the present disclosure.

FIG. 7 includes cross-sectional side views of various latch assemblies that may be utilized to couple multiple screens 16 to one another to facilitate installation and removal of the multiple screens 16 in the shaker system 10 of FIG. 1, in accordance with an embodiment of the present disclosure. In an embodiment of a first latch assembly 100, a respective leading edge 34 of one of the multiple screens 16 (e.g., the second screen 16B) may include a first latch feature 102 (e.g., an opening), and a respective trailing edge 36 of another one of the multiple screens 16 (e.g., the first screen 16A) may include a second latch feature 104 (e.g., a protrusion and a groove). The first latch feature 102 and the second latch feature 104 may contact and engage with one another as the respective leading edge 34 moves toward and overlaps with the respective trailing edge 36, which is represented in FIG. 7 as various stages of engagement of the first latch assembly 100. Further, the first latch feature 102 and the second latch feature 104 may remain engaged (e.g., may not separate) upon application of a force, such as shown by arrow 106. Accordingly, via application of the force, the first screen 16A and the second screen 16B may be removed from the shaker system 10 of FIG. 1.

In an embodiment of a second latch assembly 110, a respective leading edge 34 of one of the multiple screens 16 (e.g., the second screen 16B) may include a first latch feature 112 (e.g., longitudinally offset protrusions and grooves), and a respective trailing edge 36 of another one of the multiple screens 16 (e.g., the first screen 16A) may include a second latch feature 114 (e.g., corresponding longitudinally offset protrusions and grooves). The first latch feature 112 and the second latch feature 114 may contact and engage with one another as the respective leading edge 34 moves toward and overlaps with the respective trailing edge 36, which is represented in FIG. 7 as various stages of engagement of the second latch assembly 110. Further, the first latch feature 112 and the second latch feature 114 may remain engaged (e.g., may not separate) upon application of a force, such as shown by arrow 116. Accordingly, via application of the force, the first screen 16A and the second screen 16B may be removed from the shaker system 10 of FIG. 1.

In an embodiment of a third latch assembly 120, a respective leading edge 34 of one of the multiple screens 16 (e.g., the second screen 16B) may include a first latch feature 122 (e.g., a groove), and a respective trailing edge 36 of another one of the multiple screens 16 (e.g., the first screen 16A) may include a second latch feature 124 (e.g., a protrusion). The first latch feature 122 and the second latch feature 124 may contact and engage with one another as the respective leading edge 34 moves toward and overlaps with the respective trailing edge 36, which is represented in FIG. 7 as various stages of engagement of the third latch assembly 120. Further, the first latch feature 122 and the second latch feature 124 may remain engaged (e.g., may not separate) upon application of a force, such as shown by arrow 126. Accordingly, via application of the force, the first screen 16A and the second screen 16B may be removed from the shaker system 10 of FIG. 1.

In an embodiment of a fourth latch assembly 130, a respective leading edge 34 of one of the multiple screens 16 (e.g., the second screen 16B) may include a first latch feature 132 (e.g., a groove), and a respective trailing edge 36 of another one of the multiple screens 16 (e.g., the first screen 16A) may include a second latch feature 134 (e.g., a protrusion). The first latch feature 132 and the second latch feature 134 may contact and engage with one another as the respective leading edge 34 moves toward and overlaps with the respective trailing edge 36, which is represented in FIG. 7 as various stages of engagement of the fourth latch assembly 130. Further, as shown in a top view 138 of the fourth latch assembly 130, the first latch features 132 and the second latch feature 134 may contact and engage with one another. Further, the first latch feature 132 and the second latch feature 134 may remain engaged (e.g., may not separate) upon application of a force, such as shown by arrow 136. Accordingly, via application of the force, the first screen 16A and the second screen 16B may be removed from the shaker system 10 of FIG. 1.

It should be appreciated that one or more seal elements (e.g., elastomer seal elements) may be provided between the multiple screens 16, such as to block fluid flow across an interface between adjacent screens 16. The one or more seal elements may have any suitable form and/or position. For example, the one or more seal elements may be along a vertically-facing surface at the leading edge 34, the trailing edge 36, or both. As another example, the one or more seal elements may be along a longitudinally facing surface at the leading edge 34, the trailing edge 36, or both.

It should also be appreciated that the screen 16, the screen assembly 14, and/or any related features may be utilized in other contexts (e.g., other than a shaker system and/or other than with drilling fluid). For example, the screen 16 may be utilized in other types of filtering systems and/or in other industrial contexts.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims. For example, it should be appreciated that the any features shown in FIGS. 1-7 or described with reference to FIGS. 1-7 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A screen assembly, comprising:

a shaker frame having a sloped surface;

a plurality of screens removably coupled to the sloped surface of the shaker frame, wherein the plurality of screens are removably coupled together via latches directly between adjacent screens of the plurality of screens, wherein each screen of the plurality of screens comprises:

a screen frame; and a screen filter, wherein the screen frame includes a leading edge with a first height and a trailing edge with a second height, the screen filter extends between the leading edge and the trailing edge to provide a sloped screen surface separate from the sloped surface of the shaker frame, and the sloped screen surface is oriented at a first angle different from a second angle of the sloped surface of the shaker frame.

2. The screen assembly of claim 1, wherein each screen of the plurality of screens comprises a first latch of the latches at the leading edge, and each screen of the plurality of screens comprises a second latch of the latches at the trailing edge.

3. The screen assembly of claim 1, wherein the shaker frame comprises an actuator configured to adjust the second angle of the sloped surface of the shaker frame.

4. The screen assembly of claim 1, wherein the screen frame comprises sloped support members on opposite lateral sides of the screen, the sloped support members comprise a bottom surface and a top surface oriented at an angle relative to the bottom surface, and the screen filter couples to the top surface.

5. The screen assembly of claim 1, wherein the plurality of screens are removably coupled to the sloped surface of the shaker frame via one or more clamps.

6. The screen assembly of claim 1, wherein the first height is less than the second height.

7. The screen assembly of claim 1, wherein the sloped screen surface slopes downward toward the leading edge.

8. The screen assembly of claim 1, wherein the plurality of screens are removably coupled together at the leading and trailing edges with a height offset to provide a staggered sloped screen surface above and separate from the sloped surface of the shaker frame.

9. The screen assembly of claim 1, wherein the latches are directly between overlapping edge portions of screen frames of the adjacent screens of the plurality of screens.

10. A screen assembly, comprising:
a screen, comprising:
a screen frame comprising sloped support members on opposite lateral sides of the screen frame;
a screen filter that extends between the sloped support members to provide a sloped screen surface; and
one or more latches coupled to the screen frame, wherein the screen is configured to removably couple to one or more additional screens via the one or more latches directly between the screen and the one or more additional screens, the screen is configured to removably couple to a sloped surface of a shaker frame, the sloped screen surface is separate from the sloped surface of the shaker frame, and the sloped screen surface is oriented at a first angle different from a second angle of the sloped surface of the shaker frame.

11. The screen assembly of claim 10, wherein the screen frame defines a leading edge with a first height and a trailing edge with a second height, and the sloped screen surface slopes downward toward the leading edge of the screen frame.

12. The screen assembly of claim 10, wherein the sloped support members comprise a flat bottom surface and a sloped top surface.

13. The screen assembly of claim 10, wherein the one or more latches are directly between overlapping edge portions of the screen and the one or more additional screens when removably coupled together.

14. The screen assembly of claim 10, comprising the one or more additional screens configured to removably couple to the sloped surface of the shaker frame, each of the one or more additional screens comprising:
an additional screen frame comprising additional sloped support members on opposite lateral sides of the additional screen frame; and
an additional screen filter that extends between the additional sloped support members to provide an additional sloped screen surface, wherein the additional screen frame is configured to couple to the screen frame to provide a staggered sloped screen surface.

15. The screen assembly of claim 10, wherein the one or more latches are configured to couple together in an axial direction from a feed end to a discharge end of the screen assembly.

16. A shaker system, comprising:
a shaker frame having a sloped surface; and
a screen assembly, comprising:
a screen comprising a screen frame and a screen filter coupled to the screen frame to provide a sloped screen surface; and
an additional screen comprising an additional screen frame and an additional screen filter coupled to the additional screen frame to provide an additional sloped surface;
wherein the screen and the additional screen are configured to couple to one another via a latch assembly directly between the screen and the additional screen to form the screen assembly with a staggered sloped screen surface, and the screen assembly couples to the shaker frame to position the staggered sloped screen surface on top of the sloped surface of the shaker frame.

17. The shaker system of claim 16, wherein the latch assembly is disposed at a trailing edge of the screen at a first bottom portion of the screen frame and a leading edge of the additional screen at a second bottom portion of the additional screen frame.

18. The shaker system of claim 17, wherein the latch assembly enables removal of the screen and the additional screen from a shaker housing via application of a pulling force to the additional screen.

19. The shaker system of claim 16, comprising an actuator coupled to the shaker frame, wherein the shaker frame comprises a support member configured to support the screen and the additional screen, and the actuator is configured to adjust an angle of the support member and the sloped surface relative to a ground surface.

20. The shaker system of claim 16, wherein the screen, the additional screen, or both comprise a curved bottom surface coupled to the shaker frame.

* * * * *